US008423887B2

(12) United States Patent
Kono

(10) Patent No.: US 8,423,887 B2
(45) Date of Patent: Apr. 16, 2013

(54) INFORMATION PROCESSING APPARATUS AND INFORMATION PROCESSING METHOD

(75) Inventor: Masahiko Kono, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1551 days.

(21) Appl. No.: 11/738,729

(22) Filed: Apr. 23, 2007

(65) Prior Publication Data

US 2007/0250823 A1 Oct. 25, 2007

(30) Foreign Application Priority Data

Apr. 24, 2006 (JP) ................................. 2006-119852

(51) Int. Cl.
*G06F 17/00* (2006.01)
(52) U.S. Cl.
USPC ............................ 715/234; 715/255; 715/239
(58) Field of Classification Search .................. 715/234, 715/236, 239, 255
See application file for complete search history.

(56) References Cited

U.S. PATENT DOCUMENTS

| 6,826,726 B2* | 11/2004 | Hsing et al. ................... 715/234 |
| 6,883,137 B1* | 4/2005 | Girardot et al. ............... 715/242 |
| 7,028,306 B2* | 4/2006 | Boloker et al. ............... 719/310 |
| 2002/0023113 A1* | 2/2002 | Hsing et al. ................... 707/513 |
| 2004/0111672 A1* | 6/2004 | Bowman et al. ............... 715/513 |
| 2005/0200876 A1* | 9/2005 | Iguchi et al. .................. 358/1.13 |
| 2007/0198915 A1* | 8/2007 | Hiyama et al. ................ 715/513 |

OTHER PUBLICATIONS

Antoine Quint, "Introducing Mutation Events", Oct. 9, 2002, pp. 1-6, http://www.xml.com/pub/a/2002/10/09/mutate.html.*
SAX (http://www.saxproject.org/).
DOM (http://www.w3.org/DOM/).
SVG Micro DOM (http://www.w3.org/TR/SVGMobile12/svgudom.html).

* cited by examiner

*Primary Examiner* — Cesar Paula
*Assistant Examiner* — Howard Cortes
(74) *Attorney, Agent, or Firm* — Cowan, Liebowitz & Latman, P.C.

(57) ABSTRACT

This invention has as its object to provide an information processing apparatus which can process an event generated upon changing an attribute value at high speed. This invention is directed to an information processing apparatus which parses an XML document and converts it into a DOM tree, and has the following characteristic feature. Upon reception of an operation instruction by the user (step S312), it is checked if the instruction is an instruction including a change of an attribute value (step S313). If it is determined that the instruction is the instruction including the change of the attribute value, type information of the attribute value is acquired, and an event that describes the type information and the instruction contents is generated (steps S315-S318). An event handler processes the instruction contents in accordance with the type information (step S322).

8 Claims, 10 Drawing Sheets

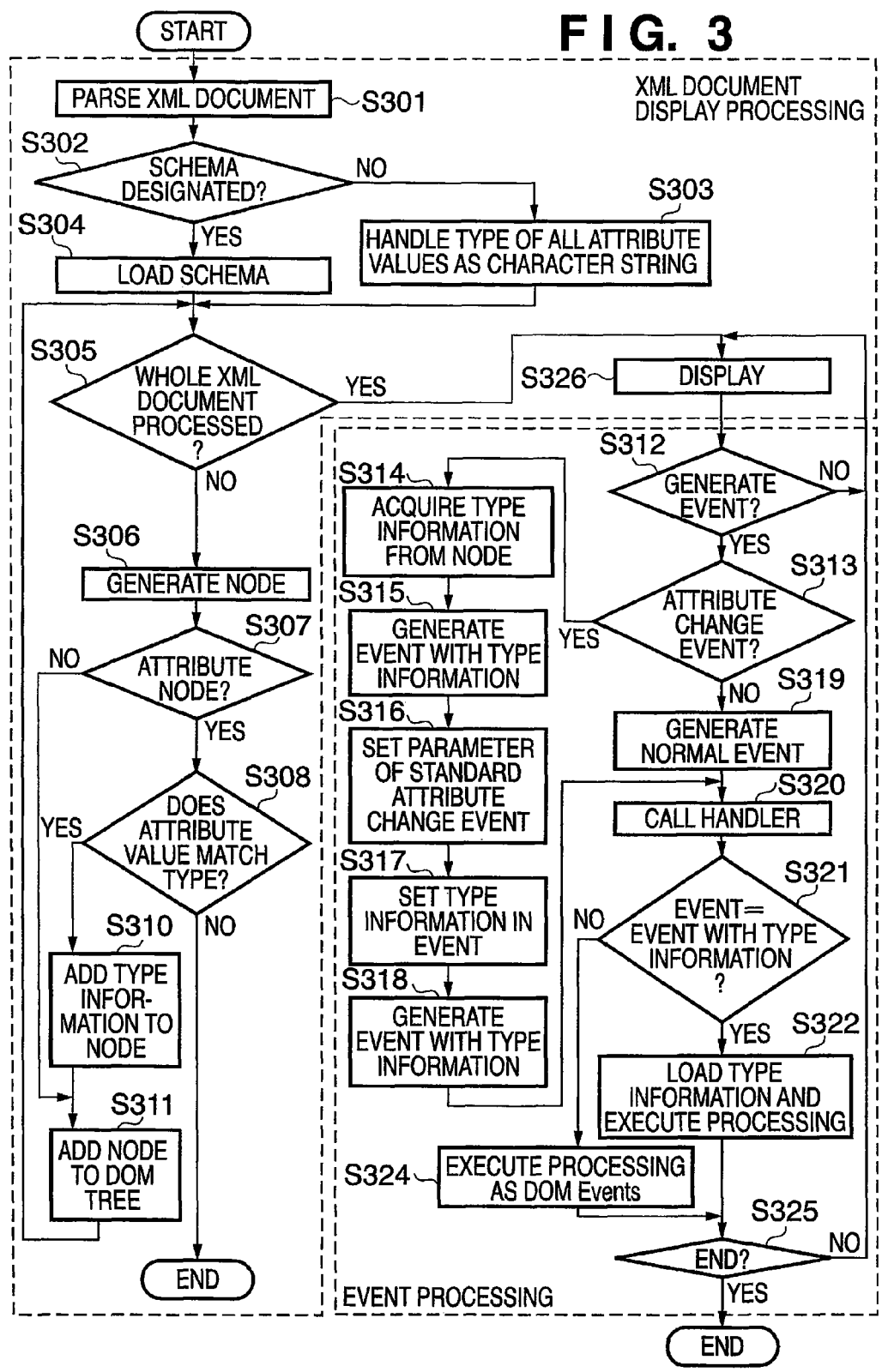

FIG. 4

```
<svg width="720" height="480"
  xmlns="http://www.w3.org/2000/svg">
  xmlns : ev="http://www.w3.org/2001/xml-event">
  <ev : listener event ="FloatMutationEvent"
   observer="renge" handler="MyEventListener"/>
  <text id="vol" x="50" y="200">Volume:50</text>

<g>
     <rect id="frame" x="60" y="220"
        width="600" height="40"
        fill="white" stroke="black"/>
     <rect id="range" x="60" y="220"
        width="300" height="40"
        fill="gray" stroke="black"/>
  </g>

</svg>
```

FIG. 7

```
interface MutationEvent : Event {

// attrChangeType
  const unsigned short MODIFICATION=1;
  const unsigned short ADDITION=2;
  const unsigned short REMOVAL=3;

readonly attribute Node relatedNode;
  readonly attribute DOMString prevValue;
  readonly attribute DOMString newValue;
  readonly attribute DOMString attrName;
  readonly attribute unsigned short attrChange;
  void initMutationEvent(
      in DOMString typeArg,
      in boolean canBubbleArg,
      in boolean cancelableArg,
      in Node relatedNodeArg,
      in DOMString prevValueArg,
      in DOMString newValueArg,
      in DOMString attrNameArg,
      in unsigned short attrChangeArg);
};
```

FIG. 8

```
interface TypedMutationEvent : MutationEvent {

// attrType
  readonly attribute DOMString typeName;
};
```

FIG. 9

```
interface FloatMutationEvent : TypedMutationEvent { readonly const float preFloatTrait;
  readonly const float newFloatTrait;
};
```

INFORMATION PROCESSING APPARATUS AND INFORMATION PROCESSING METHOD

BACKGROUND OF THE INVENTION

1. Field of the Invention

The present invention relates to an information processing technique for processing XML documents and, more particularly, to an information processing technique used upon processing an XML document as tree structure data.

2. Description of the Related Art

As standard APIs of an XML parser, SAX and DOM are generally known (details of SAX and DOM are described at sites designated by, for example, "URL:http://www.sax-project.org/" and "URL:http://www.w3.org/DOM/").

SAX sequentially reads an XML document from the beginning, and transfers information to an application program via an event which is generated in the process of reading. That is, the SAX sequentially transfers information in turn from findings during parsing of the XML document, and starts processing before completion of parsing. For this reason, the SAX can speed up the processing of XML documents.

On the other hand, DOM handles an XML document as tree structure data (DOM tree). For this reason, the DOM can access data in the XML document only after an XML parser has read the whole XML document. Hence, the processing speed of the DOM is lower than the SAX. Then again, the DOM can access irrespective of the order of data in the XML document.

A schema often defines a type of an attribute which is converted into tree structure data as a DOM tree (for example, "5" of x="5" is that of an integer, etc.). As a characteristic feature of the DOM tree, even when the schema defines the type of the attribute (x) to be other than a character string, the attribute value ("5") is held as a character string.

Also, attribute values before and after a change of events (DOM Events) which are generated in response to a change in attribute value of the DOM tree are held as character strings irrespective of the schema's definition.

However, in general, when an application executes processing using a DOM tree generated based on an XML document, attribute values are often used after they are converted into types of the schema (for example, an attribute value of an x attribute that represents an x-coordinate is processed after it is converted into an integer or floating point number).

For this reason, when an event upon changing an attribute value is generated, an event handler that processes the event must execute processing for converting a changed attribute value held by the event from a character string to a type designated by the schema. In case of the DOM, requirement of such conversion processing also disturbs speeding up of the processing.

On the other hand, there is a special DOM which is assumed to have an attribute value as a type designated by the schema from the beginning in place of a character string, like SVG Micro DOM (http://www.w3.org/TR/SVGMobile12/svgudom.html).

However, even when such a special DOM is used, if a standardized event is used as an event that is generated upon changing an attribute value, similar conversion processing is required. More specifically, redundant processing is required: a type designated by the schema is converted into a character string, which is set in an event, and the event handler converts that character string into the type designated by the schema.

SUMMARY OF THE INVENTION

The present invention has been made in consideration of the aforementioned problems, and achieves a process an event which is generated upon changing an attribute value at high speed.

An information processing apparatus according to the present invention comprises the following arrangement. That is, an information processing apparatus which parses an XML document and converts the XML document into tree structure data including an element and an attribute upon processing the XML document by an application, comprising:

determination unit configured to, when an instruction from a user is input via the application, determine whether or not the instruction is an instruction including a change of a value of the attribute;

event generation unit configured to, when the determination unit determines that the instruction is not the instruction including the change of the value of the attribute, generate a first event which describes contents of the instruction, and for, when the determination unit determines that the instruction is the instruction including the change of the value of the attribute, acquiring type information of the value of the attribute and generate a second event which describes the type information and contents of the instruction; and event processing unit configured to receive one of the first event and the second event generated by the event generation unit, and executing processing based on the event, wherein the event processing unit processes the instruction contents as a character string upon reception of the first event, and processes the instruction contents according to the type information upon reception of the second event.

According to the present invention, an event which is generated upon changing an attribute value can be processed at high speed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart showing the procedure of XML document display processing and event processing upon changing an audio output setting by the information processing apparatus in the television receiver;

FIG. 4 shows an example of an XML document;

FIG. 7 shows an example of an IDL description of a MutationEvent defined in DOM Events;

FIG. 8 shows an example of an IDL description of a Typed-MutationEvent which inherits the MutationEvent and is added with a member typeName that represents type information;

FIG. 9 shows an example of an IDL description of a Float-MutationEvent used when typeName="float"

DESCRIPTION OF THE EMBODIMENTS

Preferred embodiments of the present invention will now be described in detail in accordance with the accompanying drawings.

Note that the following embodiment will exemplify a case wherein an information processing apparatus according to one embodiment of the present invention is incorporated in a television receiver.

1. Arrangement of Television System

Figure 1:
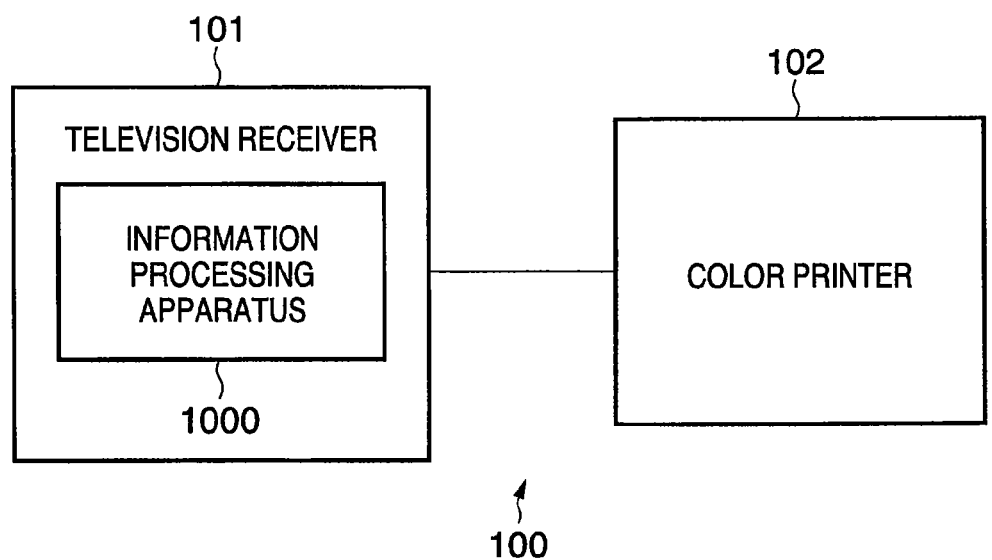
FIG. 1 is a diagram showing the arrangement of a television system which comprises a television receiver incorporating an information processing apparatus according to an embodiment of the present invention, and a color printer connected to the television receiver to allow communications with it.

FIG. 1 shows the arrangement of a television system 100 which comprises a television receiver 101 incorporating an information processing apparatus 1000 according to one embodiment of the present invention, and a color printer 102 connected to the television receiver 101 to allow communication with it.

The television system 100 can display a received video picture on the television receiver 101 and can output a video picture displayed on the television receiver 101 to the color printer 102. Note that operation instructions to the television receiver 101 are issued via operation switches (not shown) of the television receiver 101 or operation of a remote controller.

2. Hardware Arrangement of Built-in Information Processing Apparatus

Figure 10:
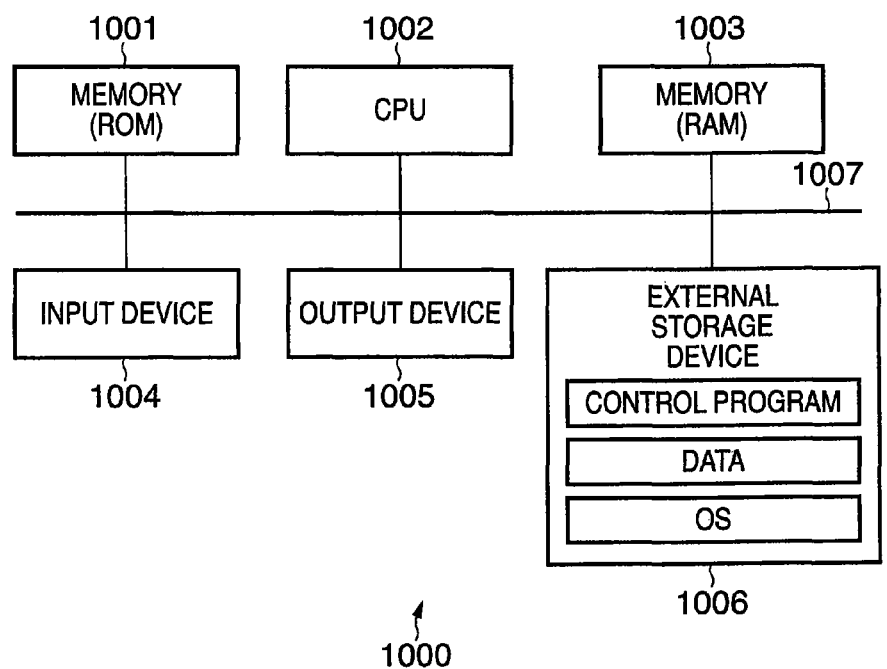
FIG. 10 is a block diagram showing the hardware arrangement of the information processing apparatus incorporated in the television receiver.

FIG. 10 shows the hardware arrangement of the information processing apparatus 1000 incorporated in the television receiver 101.

Referring to FIG. 10, reference numeral 1001 denotes a control memory (ROM), reference numeral 1002 denotes a CPU, and reference numeral 1003 denotes a memory (RAM). Reference numeral 1004 denotes an input device which inputs a signal received by a remote-controller light-receiving unit (to be described later), and reference numeral 1005 denotes an output device which outputs the processing result of the information processing apparatus 1000 to a CRT. Reference numeral 1006 denotes an external storage device, and reference numeral 1007 denotes a bus.

The external storage device 1006 stores control programs required to implement the information processing functions according to this embodiment, data used in these control programs, and an OS. These control programs and data, and OS are loaded onto the memory 1003 as needed via the bus 1007 under the control of the CPU 1002, and are executed by the CPU 1002.

3. Functional Arrangement of Television Receiver

Figure 2:
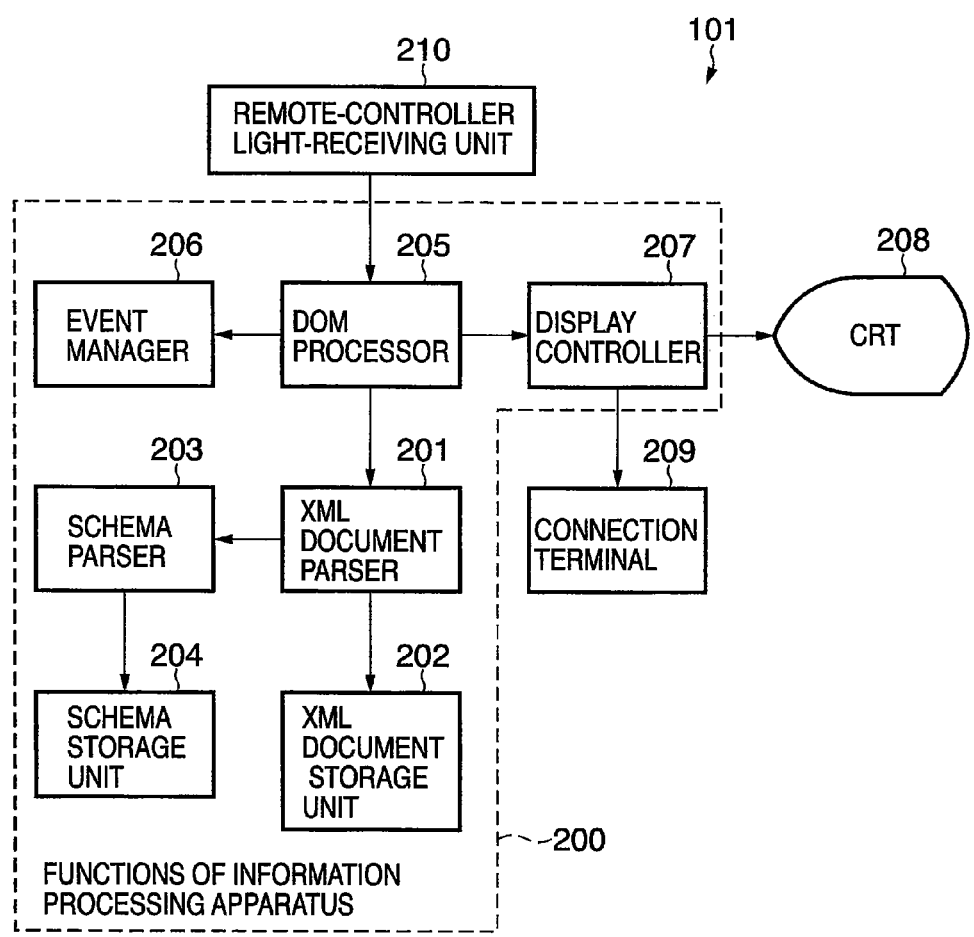
FIG. 2 is a functional block diagram of the television receiver.

FIG. 2 is a functional block diagram of the television receiver 101. Note that FIG. 2 shows only functions associated with the processing executed upon changing the setting contents of the television receiver 101 based on an operation instruction by operating a remote controller, of those of the television receiver 101, and does not show other functions of the television receiver. Reference numeral 200 denotes functions of the information processing apparatus 1000 incorporated in the television receiver 101. Note that the information processing functions 200 can be incorporated in devices other than the television receiver, and may be incorporated in devices such as a color printer, scanner, video, video camera, and the like. When the functions shown in FIG. 2 are implemented by software or the like as in this embodiment, the information processing functions 200 in FIG. 2 need not always be implemented in devices.

A case will be described below wherein an audio output setting is changed as an example of the change of the setting contents in the television receiver 101.

Reference numeral 210 denotes a remote-controller light-receiving unit, which receives an audio output setting change operation of the television receiver 101 from a remote controller.

Reference numeral 205 denotes a DOM processor, which issues a parsing instruction of an XML document corresponding to the audio output setting change operation to an XML document parser 201, and generates a DOM tree based on the parsing result of the XML document by the XML document parser 201. Also, the DOM processor 205 issues a display instruction to a display controller 207 to display an audio output operation window on a CRT 208. Furthermore, the DOM processor 205 receives an event generated by an event manager 206, and outputs a display change instruction to the display controller 207.

Note that the DOM tree is obtained by converting all elements and attributes included in an XML document into tree structure data, and elements and attributes converted into tree structure data will be generically named as nodes.

Reference numeral 201 denotes an XML document parser, which parses an XML document stored in an XML document storage unit 202, and detects elements and attributes included in the XML document.

Reference numeral 202 denotes an XML document storage unit, which stores XML documents. In this embodiment, the XML document storage unit 202 stores graphics to be displayed on the CRT 208 as XML documents. FIG. 4 shows an example of an XML document stored in the XML document storage unit 202.

Reference numeral 203 denotes a schema parser, which parses based on the parsing result of the XML document parser 201 whether or not the XML document of interest is a document according to a schema. Reference numeral 204 denotes a schema storage unit, which stores schemas that describe possible structures of XML documents. Note that type information of an attribute is defined in a schema.

4. Configuration of Event Generated by Event Manager

Two types of events generated by the event manager 206 of the information processing apparatus according to this embodiment will be described below.

4.1 Normal Event

FIG. 7 shows an example of an IDL description of a MutationEvent defined by DOM Events. The DOM Events are generated upon input of a user's operation instruction. The MutationEvent shown in FIG. 7 is an event which is generated when the user's operation instruction is input and does not include any change in attribute value.

4.2 Event Including Change in Attribute Value

FIG. 8 shows an example of an IDL description of a TypedMutationEvent which inherits the MutationEvent and is added with a member typeName that represents type information.

FIG. 9 shows an IDL description of a FloatMutationEvent used when the member of the TypedMutationEvent is typeName="float".

As will be described later, events shown in FIGS. 8 and 9 are generated when a user's operation instruction is input and includes a change in attribute value.

In the information processing apparatus 1000 according to this embodiment, when an attribute value whose type information is defined as a floating point number in the schema is changed from, for example, 10.0 to 20.0, the TypedMutationEvent and FloatMutationEvent are generated. In this case, a member of the TypedMutationEvent is set as typeName="float". Also, a member of the FloatMutationEvent is set as preFloatTrait="10.0" and newFloatTrait="20.0". In this way, the DOM processor 205 which receives these events can detect that information described in the events is a floating point number (not a character string), and is also changed from 10.0 to 20.0.

Note that the case has been explained wherein the attribute value whose type information is defined as a floating point number in the schema. However, the present invention is not limited to this. Upon changing an attribute value for which another type information is defined in the schema, an event is generated according to that type as in FIG. 8, and events that describe attribute values before and after a change in the defined type are generated, as in FIG. 9.

5. Procedure of Processing of Information Processing Apparatus in Television Receiver The procedure of XML document display processing and event processing upon changing an audio output setting by the information processing apparatus 1000 in the television receiver 101 will be described below. FIG. 3 is a flowchart showing the procedure of the XML document display processing and event processing upon changing the audio output setting by the information processing apparatus 1000 in the television receiver 101.

In step S301, the remote-controller light-receiving unit 210 receives audio output operation information of the television receiver 101 from the remote controller. The audio output operation information received by the remote-controller light-receiving unit 210 is transferred to the XML document parser 201 via the DOM processor 205. The XML document parser 201 reads out an XML document (in this case, an XML document shown in FIG. 4) corresponding to the audio output operation information from the XML document storage unit 202, and parses the readout XML document.

The schema parser 203 checks based on the parsing result of the XML document parser 201 in step S302 if schemas of elements and attributes included in the XML document are designated. If it is determined in step S302 that schemas are not designated, the process advances to step S303 to handle a type of all attribute values as a character string.

On the other hand, if it is determined in step S302 that schemas are designated, the process advances to step S304 to load schemas designated in the XML document from the schema storage unit 204.

The DOM processor 205 checks in step S305 if the whole XML document (in this case, the XML document shown in FIG. 4) which is to undergo the XML document display processing based on the audio output operation information has been processed (generation of a DOM tree is complete). If it is determined that the whole XML document has been processed, the process advances to step S326. On the other hand, if it is determined that the whole XML document has not been processed yet, the process advances to step S306 to continue generation of the DOM tree.

In step S306, the DOM processor 205 generates a node for each of respective elements and attributes of the XML document, which have been parsed by the XML document parser 201, and the presence/absence of designation of schemas of which have been checked by the schema parser 203.

It is checked in step S307 if the node generated in step S306 is an attribute node. If it is determined that the generated node is not an attribute node, the process jumps to step S311 to add that node to the DOM tree. On the other hand, if it is determined that the generated node is an attribute node, the schema parser 203 checks if an attribute value of that node matches a type (step S308). If the attribute value matches the type, type information is added to that node (step S310), and the node is added to the DOM tree. If it is determined in step S308 that the attribute value does not match the type, the processing ends.

On the other hand, if it is determined in step S305 that the whole XML document has been processed (generation of the DOM tree is complete), the process advances to step S326.

Figure 5:
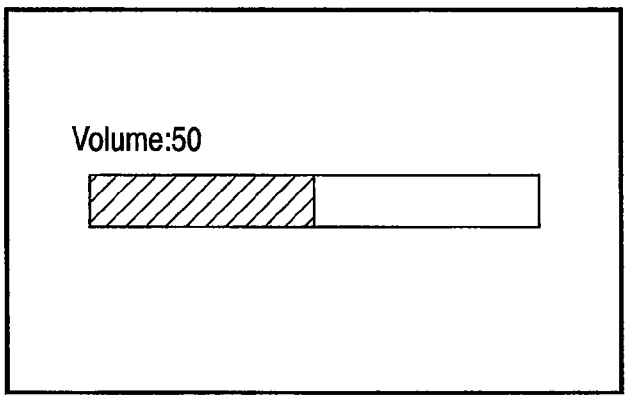
FIG. 5 shows a display result which is displayed upon processing the XML document shown in FIG. 4.

In step S326, the display controller 207 displays the processing result of the XML document on the CRT 208. FIG. 5 shows a display result which is displayed upon processing the XML document shown in FIG. 4.

Upon completion of display of the XML document, the control waits for a user's remote-controller operation that generates an event by the event manager 206. The control maintains a waiting state until a user's predetermined remote-controller operation is made. Upon detection of the user's predetermined remote-controller operation, it is determined that an event is to be generated, and the process advances to step S313.

The user's predetermined remote-controller operation means an operation for, for example, turning up the volume by the remote controller, and a case will be exemplified below wherein a width attribute in a <rect> element with id="range" in FIG. 4 is changed from 300 to 450. The event manager 206 is notified of this change via the DOM processor 205.

Upon reception of the notification, the event manager 206 checks in step S313 if that change is an attribute change. If it is determined in step S313 that an event to be generated is an attribute change event, the process advances to step S314.

Type information is acquired from the changed attribute node in step S314, and an event that describes the acquired type information and an event that describes the attribute values before and after a change based on the type information are generated in step S315. In step S316, the attribute values before and after a change are set in members of the event that describes the attribute values before and after a change based on the type information. Furthermore, in step S317, the type information is set in a member of the event that describes the type information.

In this embodiment, a FloatMutationEvent (FIG. 9) that inherits a TypedMutationEvent (FIG. 8) is generated. Inheritance allows expansion. Since the type information of the width attribute is defined as a floating point number in the schema, "float" is set in typeName. Also, "300" is set in preFloatTrait, and "450" is set in newFloatTrait.

In step S318, the event manager 206 notifies the DOM processor 205 of the TypedMutationEvent and FloatMutationEvent. In this way, the DOM processor 205 detects generation of the event which describes the type information and the event that describes the attribute values before and after a change based on the type information.

On the other hand, if it is determined in step S313 that the change is not an attribute change, the process advances to step S319, and the event manager 206 notifies the DOM processor 205 of a normal event (an event that does not describe any type information (FIG. 7)). In this way, the DOM processor 205 detects generation of the normal event.

In step S320, the DOM processor 205 searches for a handler (the processing contents of which are defined for each event) of the generated event by tracing from a node of the generated event to its parent node. If an event handler is found, the DOM processor 205 passes that event to call the event handler.

It is checked in step S321 if the generated event is an event that describes type information. If it is determined in step S321 that the generated event is an event that describes type information (FIG. 9), the process advances to step S322 to execute processing by loading the attribute values before and after changes based on the type information. In the case of this embodiment, the attribute value=300 before a change and the attribute value=400 after a change are handled as floating point numbers.

On the other hand, if it is determined that the generated event is not an event that describes type information, the process advances to step S324 to execute processing as MutationEvents (FIG. 7) (all attribute values are handled as character strings).

As described above, in the case of this embodiment, the TypedMutationEvent and FloatMutationEvent are generated upon changing the audio output setting. For this reason, the event handler need not execute processing for changing a member newValue of the MutationEvent from a character string to a floating point number upon processing the value after a change unlike in the prior art. That is, the event handler can use newFloatTrait in the FloatMutationEvent as numerical value information of a floating point number.

Figure 6:
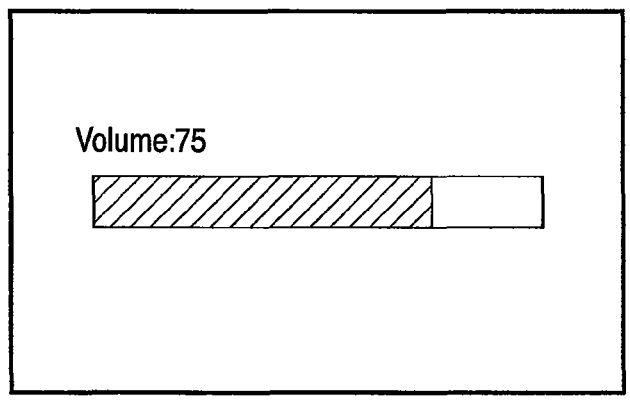
FIG. 6 shows a display result which is displayed by processing the XML document whose attribute value has been changed.

In this embodiment, the value of a width attribute in a <rect> element with id="frame" in FIG. 4 represents a maximum width of a tone volume indication bar in FIGS. 5 and 6, and the value of a width attribute in a <rect> element with id="range" represents the current width (the hatched width in FIG. 5 or 6) of the tone volume indication bar. In case of FIG. 4, the maximum width of the tone volume indication bar is 600, and the width of the current tone volume indication bar is 300. Also, in FIG. 4, an <ev:listener> element associates an event handler corresponding to the FloatMutationEvent to the <rect> element with id="range". For example, the event handler is described as "MyEventListener". The MyEventListener describes, using a program such as Java or the like, that the tone volume is calculated from the value of the width attribute in the <rect> element with id="frame" and that of the width attribute in the <rect> element with id="range", and the contents of a <text> element with id="vol" are written in accordance with the calculated tone volume. With this event handler, upon generation of a FloatMutationEvent in the <rect> element with id="range", the event handler "MyEventListener" rewrites the contents of the <text> element with id="vol" in accordance with the current tone volume. If the width of the tone volume indication bar is changed from 300 to 450, since 450/600=75% by dividing 450 by 600 as the maximum width, an element bounded by a <text> tag is rewritten to Volume: 75. As a result, "Volume: 75" is displayed on the CRT 208, as shown in FIG. 6.

It is checked in step S325 if a processing end instruction is detected. If an end instruction is not input, the process returns to step S326 to wait for a user's remote-controller operation instruction. On the other hand, if an end instruction is input, the processing ends.

As described above, the information processing apparatus according to this embodiment is characterized in that it does not handle events to be generated as character strings without exception upon generation of a DOM tree by parsing an XML document and executing attribute value change processing of the DOM tree using the event manager. Instead, by generating an event having type information, and an event that describes attribute values before and after a change based on the type information, an event handler which executes processing upon reception of the events can skip conversion processing from a character string into an attribute value according to the type information. As a result, even when the attribute value of the DOM tree is to be changed, the change processing can be efficiently executed.

6. Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus. In this case, the functions are implemented when a computer (or a CPU or MPU) of the system or apparatus reads out and executes the program code stored in the storage medium. Note that, in this case, the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The present invention is not limited to a case wherein the functions of the above-mentioned embodiments are implemented when the computer executes the readout program code. For example, the present invention also includes a case wherein an OS (operating system) running on the computer executes some or all of actual processing operations based on an instruction of the program code to implement the functions of the above-mentioned embodiments.

Furthermore, the present invention also includes a case wherein the functions of the above-mentioned embodiments are implemented after the program code read out from the storage medium is written in a memory of a function expansion board or a function expansion unit, which is inserted into or connected to the computer. That is, the present invention also includes a case wherein after the program code is written in the memory, a CPU or the like of the function expansion board or function expansion unit executes some or all of actual processing operations to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-119852 filed on Apr. 24, 2006, which is hereby incorporated by reference herein in its entirety.

What is claimed is:

1. An information processing apparatus which processes tree structure data converted from an XML document, wherein the tree structure data includes a numerical value of an attribute, comprising:
   a determination unit configured to, when an operation instruction is input, determine whether or not the operation instruction is an instruction including a change of the numerical value of the attribute;
   a first event generation unit configured to, when said determination unit determines that the operation instruction is not the instruction including the change of the numerical value of the attribute, generate a first event which describes contents of the operation instruction in a character string format;
   a second event generation unit configured to, when said determination unit determines that the operation instruction is the instruction including the change of the numerical value of the attribute, acquire type information of the numerical value of the attribute from the tree structure data and generate a second event which describes the type information of the numerical value of the attribute and contents of the operation instruction;
   a reception unit configured to receive at least one of the first event generated by the first event generation unit and the second event generated by the second event generation unit;
   a first event processing unit configured to process, upon reception of the first event, the first event as the character string format, said first event processing unit being a central processing unit;
   a second event processing unit configured to process, upon reception of the second event, the second event as the format of type information without converting the second event from the character string format to the format of the type information.

2. The apparatus according to claim 1, wherein the XML document is converted into the tree structure data using a DOM.

3. The apparatus according to claim 2, wherein the first event is a MutationEvent of DOM Events, and the second event inherits the MutationEvent of the DOM Events.

4. The apparatus according to claim 3, wherein the type information is information that indicates a floating point number.

5. The apparatus according to claim 1, wherein the type information is associated with a node of the tree structure data according to a schema.

6. The apparatus according to claim 1, further comprising:
   a conversion unit configured to, when a schema is designated, convert the XML document to the tree structure data according to the schema, and to, when the schema is not designated, convert the XML document to the tree structure whose attribute value is handled as a character string.

7. An information processing method in an information processing apparatus which processes tree structure data converted from an XML document, wherein the tree structure data includes a numerical value of an attribute, comprising:
   a determination step of determining, when an operation instruction is input, whether or not the operation instruction is an instruction including a change of the numerical value of the attribute;
   a first event generation step of generating, when it is determined in the determination step that the operation instruction is not the instruction including the change of the numerical value of the attribute, a first event which describes contents of the operation instruction in a character string format;
   a second event generation step of, when it is determined in the determination step that the operation instruction is the instruction including the change of the value of the attribute, acquiring type information of the numerical value of the attribute from the tree structure data and generating a second event which describes the type information of the numerical value of the attribute and contents of the operation instruction;
   a reception step of receiving at least one of the first event generated in the first event generation step and the second event generated in the second event generation step;
   a first event processing step of processing, upon reception of the first event, the first event as the character string format; and
   a second event processing step of processing, upon the reception of the second event, the second event as the format of type information without converting the second event from the character string format to the format of the type information.

8. A non-transitory computer readable medium storing a control program for making a computer execute an information processing method according to claim 7.

* * * * *